United States Patent
Lanfranchi

(10) Patent No.: US 7,497,322 B2
(45) Date of Patent: Mar. 3, 2009

(54) STAR WHEEL CONVEYOR FOR EMPTY PLASTIC BOTTLES OR CONVEYORS

(75) Inventor: Lino Lanfranchi, Collecchio (IT)

(73) Assignee: Lanfranchi S.R.L., Collecchio (IT)

( * ) Notice: Subject to any disclaimer, the term of this patent is extended or adjusted under 35 U.S.C. 154(b) by 14 days.

(21) Appl. No.: 11/883,841

(22) PCT Filed: Sep. 8, 2006

(86) PCT No.: PCT/EP2006/008769

§ 371 (c)(1),
(2), (4) Date: Aug. 7, 2007

(87) PCT Pub. No.: WO2007/031239

PCT Pub. Date: May 22, 2007

(65) Prior Publication Data

US 2008/0190739 A1    Aug. 14, 2008

(30) Foreign Application Priority Data

Sep. 12, 2005   (IT) .......................... PR2005A0051

(51) Int. Cl.
*B65G 47/84* (2006.01)

(52) U.S. Cl. .................. 198/473.1; 198/471.1

(58) Field of Classification Search ............ 198/471.1, 198/473.1, 478.1, 689.1
See application file for complete search history.

(56) References Cited

U.S. PATENT DOCUMENTS

| 1,574,307 | A | * | 2/1926 | Risser .................... 198/867.15 |
| 4,075,086 | A | * | 2/1978 | Marsh et al. ................. 209/522 |
| 5,373,934 | A | * | 12/1994 | Jackson et al. ........... 198/803.8 |
| 5,762,116 | A | * | 6/1998 | Moore ......................... 141/145 |
| 7,007,793 | B2 | * | 3/2006 | Stocchi .................... 198/473.1 |
| 7,219,790 | B2 | * | 5/2007 | Lanfranchi ............... 198/471.1 |

FOREIGN PATENT DOCUMENTS

WO   2004/074144  A2   9/2004

* cited by examiner

*Primary Examiner*—James R Bidwell
(74) *Attorney, Agent, or Firm*—Young & Thompson

(57) ABSTRACT

The invention finds application in the field of machines for orienting and aligning empty plastic bottles or containers and particularly relates to a star wheel conveyor for unloading the bottles or containers from such a machine. The conveyor (1) is of the type having a plurality of box-like pockets which have a slit through which negative pressure is generated in the pocket to hold the container. Particularly, each pocket (7) is interchangeable and may be quick-connected to the star wheel structure to allow replacement thereof when changing the container format.

1 Claim, 1 Drawing Sheet

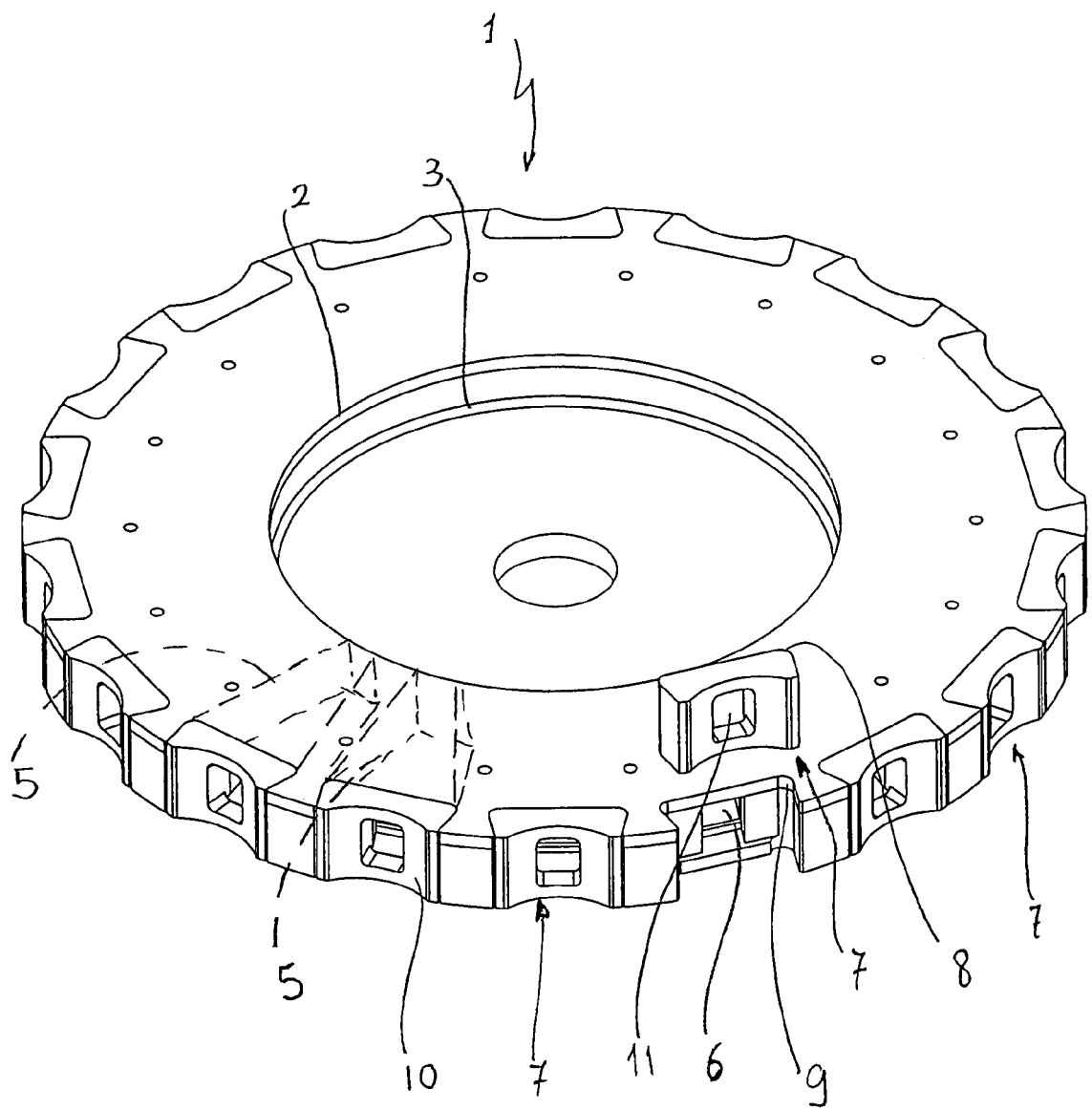

STAR WHEEL CONVEYOR FOR EMPTY PLASTIC BOTTLES OR CONVEYORS

DESCRIPTION

The invention relates to a star wheel conveyor for empty plastic bottles or conveyors.

It particularly addresses those conveyors in which the containers are held in pockets by creating a negative pressure at the pockets.

Star wheel conveyors of this type are known and used in various types of straightening and aligning machines adapted to receive bulk plastic bottles or containers and arrange them neck up in a row.

Star wheel conveyors having vacuum pockets are also used to orient or divide a stream of such containers into one or two streams having different directions from the starting flow.

They can be further used for conveying containers from one machine to another of a container filling line.

In prior art, star wheel conveyors are also used which comprise a plurality of pockets uniformly arranged along the periphery of two plates.

Each pocket includes a box-like element in which vacuum is created, which has a slit or aperture on a face conforming the curved shape of the pocket for sucking the facing bottle.

An example of a star wheel conveyor of this type is disclosed in International patent application PCT/EP2004/000508 by the applicant hereof.

Another prior art system is disclosed in patent JP58172109, wherein suckers are provided in a star arrangement.

Neither of the above solutions can successfully solve the bottle interchangeability problem.

International patent application PCT/EP2004/000508 solves the problem of handling bottles having the same shape and different capacities, but when shape changes, e.g. when switching to oval or asymmetric shapes, the pocket shape shall be also changed accordingly.

The object of this invention is to allow a quick change of all pockets as the bottle shape changes.

These objects and advantages are achieved by a star wheel conveyor for empty plastic bottles or containers of this invention, which is characterized by the annexed claims.

These and other features will be more apparent from the following description of a few embodiments, which are shown by way of example and without limitation in the accompanying drawings, in which:

the only FIGURE is a perspective FIGURE of the star wheel conveyor.

Referring to the FIGURE, numeral 1 generally designates a star wheel conveyor of the type having two parallel and spaced plates 2 and 3, on whose periphery pockets or compartments 7 are formed for receiving bottles, for instance from a bottle orienting and aligning machine, not shown.

The plates 2 and 3 are rotated about their own vertical axis by well known means, not shown.

Box-like elements 5, having a vertical aperture 6, are interposed between the two plates 2 and 3.

During rotation, the box-like elements 5 are put in communication, at a given angle, with the intake port of a known fan.

An interchangeable pocket 7 is placed at each vertical aperture 6.

For this purpose, each pocket 7 has a quick connection which is shown in the FIGURE as a dovetail surface 8 to be fitted in corresponding dovetail grooves 9 formed in the disks 2 and 3.

Each interchangeable pocket 7 has a face 10 opposite the dovetail surface 8, which conforms the shape of the side surface of the container to be sucked and conveyed.

The pocket 7 has a central opening 11 which puts the vertical aperture 6 of the box-like element 5 in communication with the face 10 of the interchangeable pocket.

As the bottle or container format changes, the pockets need simply be removed and replaced with others having an appropriately shaped face 10 conforming the shape of the container.

The invention claimed is:

1. A star wheel conveyor for empty plastic bottles or containers, comprising:
    two plates (2) and (3) with vacuum box elements (5) interposed therebetween, in which negative pressure is created at a given angle of rotation of the conveyor, and
    a plurality of interchangeable pockets (7), each pocket having a vertical aperture (11) in communication with the vacuum box element (5),
    each pocket (7) having a quick connection with the disks (2) and (3),
    wherein each quick connection consists of a dovetail surface (8) formed in a face of the pocket, and a corresponding dovetail groove (9) formed in the disks (2) and (3).

* * * * *